Patented Dec. 13, 1932                                                      1,890,590

UNITED STATES PATENT OFFICE

FONG YIH SEN, OF SHANGHAI, CHINA

MANUFACTURE OF GLUTAMIC ACID COMPOUNDS

No Drawing.    Application filed February 4, 1929.    Serial No. 337,521.

This invention relates to the manufacture of flavoring compounds and more particularly to a process of preparing sodium glutamate.

The principal object of this invention is to provide a process of preparing sodium glutamate of an extremely high degree of purity.

An important object of this invention is to provide an efficient and economical process of preparing sodium glutamate substantially free from deleterious impurities.

Other objects and advantages of this invention will become apparent during the course of the following description.

Heretofore in the commercial production of sodium glutamate it has been the substantially universal practice to effect the direct neutralization of glumatic acid hydrochloride with alkali to form mono-sodium glutamate and sodium chloride. This procedure has been attended by numerous practical difficulties, notable among which is the difficulty of separating completely the sodium chloride from the sodium glutamate. This has resulted in the production of relatively impure sodium glutamate, the final product often containing as much as from 10 to 20 per cent. of sodium chloride. Because of its impure nature the sodium glutamate prepared in accordance with the commercial processes commonly employed prior to this invention has been extremely limited in its use as a flavoring compound. For example, such a product cannot be used satisfactorily as a flavoring compound in the preparation of confectionery or other sweet foods. I have discovered that the disadvantages of the prior processes referred to can be substantially completely obviated and it is the primary purpose of this invention to provide an efficient and economical process of preparing sodium glutamate which is intended and adapted for use as a flavoring compound in preparing articles of food intended to possess a sweet taste.

In its broad aspect my process consists in hydrolyzing substantially dry gluten at controlled elevated temperatures, preferably under atmospheric pressure, with substantially concentrated hydrochloric acid which is preferably employed in conjunction with a hydrolysis catalyst, preferably substantially concentrated nitric acid. The glutamic acid hydrochloride thus produced is then separated from the mother liquor, which is preferably treated to recover the hydrochloric acid therefrom for further use in the practice of the process. Preferably after purification the glutamic acid hydrochloride is reacted upon to form free glutamic acid. The free glutamic acid formed is separated, preferably by crystallization, and thereafter is reacted with soda ash, sodium bicarbonate or caustic soda, preferably soda ash, to form sodium glutamate, which after separation and purification is in condition for use as desired, but preferably for use in preparing confectionery and other sweet foods.

In the preferred practice of my process, which may be considered as illustrative of this invention, substantially dry gluten is ground to any desired degree of fineness, preferably to a fine powder, and is screened to remove any impurities present. A revolving screen of the character commonly employed in the art will be found to be advantageous for this purpose. The gluten which I have found to be particularly advantageous to employ in the practice of my process preferably should not contain in excess of 3 per cent. of moisture, since in the manufacture of glutamic acid and its salts substantially dry gluten is far superior to wet gluten for hydrolysis with hydrochloric acid. Dry gluten ordinarily contains less than 3 per cent. of moisture while wet gluten generally contains from 60 to 70 per cent. of moisture. Since, as I have found, the amount of moisture in dry gluten does not materially lower the concentration of the hydrochloric acid employed with a resulting decrease in the efficiency of the process as is true where wet gluten is employed. I prefer to use and recommend the use of substantially dry gluten.

In the preparation of the dry gluten to be used in the practice of my process wet gluten is dehydrated in vacuum at a moderately elevated temperature. Any desired degree of vacuum and temperature may be employed, with the exception that the temperature preferably should not exceed 75° C., since at a temperature above this point the protein matter in the gluten commences to coagulate. Since coagulated protein matter is more difficultly soluble in hydrochloric acid than uncoagulated protein matter, with a consequent material decrease in the yield of sodium glutamate in the practice of the process, it will be apparent that it is highly advantageous to conduct the drying of the gluten at a temperature below 75° C. The drying operation is continued until the moisture content in the gluten preferably does not exceed 3 per cent.

The dried and finely ground gluten is then treated with hydrochloric acid at an elevated temperature to effect the hydrolysis of the gluten into glutamic acid hydrochloride. In order to produce a maximum yield and a high degree of purity of the product I prefer to effect the hydrolysis under special conditions of control of the temperature and pressure employed and of the hydrolyzing agent. In the first place, the vegetable protein in the gluten should be dissolved in the acid employed at a temperature below its coagulating point before a higher temperature is applied to effect complete hydrolysis. Moreover, the hydrolysis should be effected under atmospheric pressure since heating under increased pressure has a distinct destructive action on the glutamic hydrochloric acid formed. Moreover, the product resulting from hydrolysis under increased pressure is considerably darker in color which renders the subsequent purification of the product extremely difficult. Furthermore, the hydrochloric acid is preferably employed in concentrated form since concentrated hydrochloric acid is a much more effective hydrolyzing agent than dilute hydrochloric acid. A further advantage is that when the concentrated acid is employed the time required for the completion of hydrolysis is much shorter. Moreover, the amount of acid required for the same yield of glutamic acid hydrochloride is reduced approximately 40 per cent. when the acid is of high concentration and is not diluted by water present in the gluten. Furthermore, for the same amount of protein the yield of amino acids is materially higher when the hydrolysis is effected with undiluted acid.

I have further discovered that the effectiveness of my process is materially increased when the concentrated hydrochloric acid is employed in conjunction with a hydrolysis catalyst. As a catalytic agent I have discovered that nitric acid, particularly the concentrated acid, is far superior to metals and metallic salts and that the addition of a small amount of substantially concentrated nitric acid to the hydrochloric acid materially hastens the hydrolysis and increases the yield of glutamic acid hydrochloride. Since relatively large quantities of nitric acid exert no beneficial effect the use of only a small amount is recommended. In place of nitric acid manganese dioxide may be employed. This material has a catalytic action similar to nitric acid although somewhat less satisfactory. The use of tin, iron, other heavy metals or their salts as catalytic agents however, is highly objectionable because of the voluminous quantities of the carbonate or hydroxide formed upon addition of alkali with the result that the amount of soluble salts retained is considerable. This is highly detrimental since it is impossible to wash such precipitates satisfactorily without using an undesirable amount of water.

Proceeding in accordance with my discoveries, approximately 100 parts by weight of dry gluten are digested with a mixture composed of approximately 150 parts of hydrochloric acid of 1.16 density and approximately 5 parts of nitric acid of 1.35 density, with constant agitation, at a moderately elevated temperature, preferably from 70 to 75° C., until the purple color of the mixture disappears. The heat is then increased and the hydrolysis completed at a materially higher temperature, preferably above 100° C. but below a temperature harmful to the mixture being treated or to the product formed. I have found that a temperature slightly higher than 100° C. is advantageous in the practice of the process. The heating is preferably carried out under atmospheric pressure and is continued until the hydrolysis is completed. This ordinarily requires about 14 hours. During the hydrolysis a reflux condenser is preferably employed in order to recover the hydrochloric acid driven off from the mixture by evaporation.

The hydrolyzed liquid produced is then filtered to remove humus and other insoluble matter. The filtrate is then cooled and placed in a refrigerated room for approximately 24 hours during which period practically all of the glutamic acid hydrochloride separates in solid state while the ammonium chloride, dextrine, glucose, and the like remain in solution. The crude glutamic acid hydrochloride thus formed is collected over a vacuum filter and preferably washed with concentrated hydrochloric acid. It is then purified by dissolving it in the smallest amount of water possible and reprecipitating the material by saturating the aqueous solution thus obtained with dry hydrogen chloride gas. This product may be again washed and reprecipitated if desired. I have found that two reprecipitations yield glutamic acid hydrochloride in practically pure state.

The glutamic acid hydrochloride prepared in the manner described above is then treated in any suitable manner to produce free glutamic acid therefrom. I prefer to accomplish this by dissolving the purified glutamic acid hydrochloride in the smallest amount of hot water possible to effect solution and treat this solution with an aqueous solution containing soda ash, sodium bicarbonate or caustic soda, preferably soda ash, in approximately the theoretical amount required to combine with the HCl radical of the glutamic acid hydrochloride. I prefer to add to a solution of approximately 100 parts of the purified glutamic acid hydrochloride prepared in accordance with my invention dissolved in the least amount of hot water capable of effecting solution, a solution made by dissolving an equivalent amount of soda ash in approximately 100 parts of water. Since free glutamic acid is only slightly soluble in cold water and separates from a cold aqueous solution in crystalline form, I prefer to separate the free acid by cooling the solution prepared in the manner described above. This is preferably accomplished by introducing the solution into a refrigerated room for approximately 24 hours. The free glutamic acid crystals which separate are then collected over a vacuum filter and washed with ice-cold water until the sodium chloride present is reduced to a minimum.

The free glutamic acid thus prepared is then completely neutralized with a solution of soda ash, sodium bicarbonate or caustic soda, preferably soda ash. The resulting solution is filtered to remove any dirt that has been introduced through handling during the process, and the filtered solution is evaporated in a steam jacketed vessel until crystals of mono-sodium glutamate commence to appear. The solution is then cooled and removed to a refrigerated room and kept there until the mono-sodium glutamate crystalizes in massive form. The crystals thus produced are preferably collected over a vacuum filter, sucked as dry as possible, transferred to shallow enameled trays and dried in a vacuum shelf drier by electric heating. The thus dried product is then ground to a fine powder and passed through a sieve. The product is then in condition for use as desired.

The separation of glutamic acid in the free state and the subsequent neutralization after removal of sodium chloride and other soluble impurities by repeated washing as described above results in the production of highly pure sodium glutamate which is practically free from sodium chloride and which is particularly suitable for use in preparing confectionery and other sweet foods. It will be obvious that the sodium glutamate prepared in accordance with this invention is materially higher in flavoring power and household value.

As heretofore stated the use of dry gluten is particularly recommended in the practice of my process. By employing dry gluten it is possible to effect a substantial recovery of hydrochloric acid from the mother liquor remaining after the removal of the crude glutamic acid hydrochloride crystals as described above. This is of material importance since the recovery of hydrochloric acid is not economical in the usual practice because of the low acid concentration of the mother liquor. The hydrochloric acid that can be recovered when dry gluten is employed in the process amounts to approximately 30 per cent of the acid ordinarily used. This amount taken together with the 40 per cent. reduction in the amount of acid required at the beginning of the hydrolysis of the gluten makes a total saving of approximately 70 per cent. in the hydrochloric acid consumption.

Moreover when wet gluten is used the hydrolyzed product requires considerable evaporation before a suitable concentration is reached for the separation of glutamic acid hydrocloride in solid form. This evaporation is completely eliminated in the dry gluten process. The fuel and labor saved in this step alone is more than sufficient to cover the cost of dehydrating the wet gluten.

While I have described in detail the preferred practice of my process it is to be understood that the details of procedure, the proportions of ingredients, and the arrangement of steps may be widely varied without departing from the spirit of the invention or the scope of the subjoined claims.

I claim:

1. A process of the character described comprising hydrolyzing gluten with substantially concentrated hydrochloric acid in the presence of a minor proportion of a hydrolysis catalyst selected from the group consisting of nitric acid and manganese dioxide, converting the glutamic acid hydrochloride formed into free glutamic acid, and recovering said glutamic acid.

2. A process of the character described comprising hydrolyzing substantially dry gluten with substantially concentrated hydrochloric acid in the presence of a minor proportion of substantially concentrated nitric acid, converting the glutamic acid hydrochloride formed into free glutamic acid, separating said glutamic acid, and neutralizing said glutamic acid to form sodium glutamate therefrom with a neutralizing agent selected from the group consisting of soda ash, sodium bicarbonate and caustic soda.

3. A process of the character described comprising hydrolyzing substantially dry gluten with concentrated hydrochloric acid in the presence of a minor proportion of nitric acid, separating the glutamic acid hydrochloride produced in crystalline form, reacting upon said glutamic acid hydrochloride with a neutralizing agent selected from the group consisting of soda ash, sodium bicarbonate and caustic soda to convert the same into free glutamic acid, separating said glutamic acid, neutralizing said glutamic acid with a neutralizing agent selected from a group consisting of soda ash, sodium bicarbonate and caustic soda, and separating the sodium glutamate therefrom.

4. A process of the character described comprising hydrolyzing substantially dry gluten with concentrated hydrochloric acid in the presence of a minor proportion of concentrated nitric acid to form glutamic acid hydrochloride therefrom, separating said glutamic acid hydrochloride in crystalline form by cooling, converting the separated glutamic acid hydrochloride into free glutamic acid, separating said free glutamic acid by cooling, and neutralizing said glutamic acid with soda ash to form sodium glutamate therefrom.

5. A process of the character described comprising hydrolyzing gluten with substantially concentrated hydrochloric acid in the presence of a minor proportion of a hydrolysis catalyst selected from the group consisting of nitric acid and manganese dioxide and under conditions of temperature favorable to the formation of glutamic acid hydrochloride, and separating the glutamic acid hydrochloride formed.

6. A process of the character described comprising hydrolyzing gluten having a moisture content not in excess of 3 per cent. with substantially concentrated hydrochloric acid in the presence of a minor proportion of substantially concentrated nitric acid under conditions of temperature and pressure favorable to the formation of glutamic acid hydrochloride, and separating the glutamic acid hydrochloride formed.

7. A process of the character described comprising hydrolyzing gluten having a moisture content not substantially in excess of 3 per cent. with substantially concentrated hydrochloric acid in the presence of a minor proportion of substantially concentrated nitric acid at approximately atmospheric pressure and under conditions of temperature favorable to the formation of glutamic acid hydrochloride, and cooling the resulting mixture to separate therefrom the glutamic acid hydrochloride formed.

8. A process of the character described comprising treating substantially dry gluten with substantially concentrated hydrochloric acid in the presence of a minor proportion of a hydrolysis catalyst selected from the group consisting of nitric acid and manganese dioxide at a temperature not in excess of 75° C. to dissolve vegetable protein present, continuing the treatment at a relatively higher temperature to effect the formation of glutamic acid hydrochloride, and separating the same from the mother liquor.

9. A process of the character described comprising treating substantially dry gluten with substantially concentrated hydrochloric acid in the presence of a minor proportion of substantially concentrated nitric acid at approximately atmospheric pressure and at an elevated temperature not in excess of 75° C., continuing the treatment at a temperature favorable to the formation of glutamic acid hydrochloride and in excess of 100° C. to effect substantially complete hydrolysis of the gluten into glutamic acid hydrochloride, and separating the same from the mother liquor.

10. A cyclic process of the character described comprising dehydrating substantially wet gluten at a temperature below 75° C. for a period of time sufficient to reduce the moisture content of the gluten to not in excess of 3 per cent., hydrolyzing the dried gluten with substantially concentrated hydrochloric acid in the presence of a minor proportion of substantially concentrated nitric acid under conditions of temperature and pressure favorable to the formation of glutamic acid hydrochloride, cooling the mother liquor to separate said glutamic acid hydrochloride therefrom, treating the mother liquor to recover hydrochloric acid therefrom, and re-using the recovered hydrochloric acid in the further practice of the process.

In testimony whereof I affix my signature.

FONG YIH SEN.